United States Patent [19]

Kurimoto

[11] Patent Number: 4,783,302

[45] Date of Patent: Nov. 8, 1988

[54] MANUFACTURING METHOD OF SURFACE MATERIALS HAVING PARTIALLY DIFFERENT MATERIALS

[75] Inventor: Kazunori Kurimoto, Miyada Konan, Japan

[73] Assignee: Sheller-Globe Corporation, Toledo, Ohio

[21] Appl. No.: 922,089

[22] Filed: Oct. 22, 1986

[30] Foreign Application Priority Data

Apr. 24, 1985 [JP] Japan .................................. 60-88140

[51] Int. Cl.⁴ ........................ B28B 1/20; B29C 39/10; B29C 39/12; B29C 41/04
[52] U.S. Cl. ................................... 264/251; 264/245; 264/250; 264/260
[58] Field of Search ............... 264/245, 260, 250, 251, 264/254

[56] References Cited

U.S. PATENT DOCUMENTS 4,562,025 12/1985 Gray .................................. 425/434

FOREIGN PATENT DOCUMENTS

| 0183344 | 6/1986 | European Pat. Off. ............ 264/260 |
| 4718956 | 9/1972 | Japan .................................. 264/251 |
| 0156710 | 9/1984 | Japan .................................. 264/260 |
| 0159309 | 9/1984 | Japan .................................. 264/245 |
| 1076333 | 4/1986 | Japan .................................. 264/250 |

Primary Examiner—Jan H. Silbaugh
Assistant Examiner—Karen D. Kutach
Attorney, Agent, or Firm—Harness, Dickey & Pierce

[57] ABSTRACT

A process of molding a single-piece article by placing a resin body on a divider of a resin supply container containing different resins, fitting the resin supply container against a mold surface, engaging the resin body between the divider and the mold surface defining two discrete mold chambers, rotating the resin supply container and mold surface to contact the different resins against the mold surface, and heating the mold surface to simultaneously set the different resins and the resin body into a single-piece article.

1 Claim, 3 Drawing Sheets

MANUFACTURING METHOD OF SURFACE MATERIALS HAVING PARTIALLY DIFFERENT MATERIALS

The invention generally relates to a manufacturing method for a surface material having partially different materials as will be discussed hereinbelow.

A mold forming chamber is made inside a mold by putting together a first heat-resistant forming mold, having the inner surface corresponding to the product to be manufactured, and a second mold for containing materials. Powdered, paste, or liquid thermoplastic resin materials are placed inside the mold so formed, and heated to form the desired surface material or product.

Inside the material containing mold, a partitioning wall is made with a certain distance from the inner surface of the forming mold to divide the mold chamber into a plurality of chambers and a groove of pre-determined depth is provided on the upper end of the partitioning wall. A small projection is provided in the forming mold extending toward the groove. Different kinds of resin materials are placed in the plurality of mold chambers and a resin body is placed in the groove of the partitioning wall. The forming mold and the material containing mold are put together with the small projection inserted into the resin body. The surface material is simultaneously formed from the resin materials inside the plurality of mold chambers, and the adjacent surface materials are bonded by melting the resin placed in the groove.

DETAILED DESCRIPTION OF THE INVENTION

The present invention relates to a manufacturing method for a surface material having partially different materials, e.g., used for furnishings and upholstery and the like of vehicles.

In recent years surface materials having partially different materials are being increasingly used for furniture and upholstery of vehicles such as seats, head-rests, instrument panels, glove compartments, door linings, and the like.

These surface materials have been made by cutting out portions of heat plastic resin material sheet and these portions are sewn or bonded together. That prior method is not appropriate for mass-production and the yield rate is low.

Patent No. 59-156710 of Japan suggested a manufacturing of surface materials in the following method:

A heat-resistant mold having an inner surface corresponding to the shape of the product and a material containing mold are put together to form a molding chamber inside. A partitioning wall made inside the material containing mold and small elements provided on the inner wall of said mold are put together to form a plurality of molding chambers. Thermoplastic resin materials of paste or powder are placed inside said molding chambers and heated to form the desired surface material in said plurality of chambers. Then said partitioning wall is removed and the joint of the surface materials in each chamber are heated and melted with a heater installed along said small elements. The melted materials are then flowed down along the small element to be melted to produce the surface materials.

Patent No. 59-159309 of Japan suggested a method of manufacturing the surface material in one process as follows: The inner surface of the mold is divided into a plurality of chambers by the partition as in the case described above and resin materials are placed in the mold; and, after the surface materials are formed, the partition s removed and different resin materials are placed in the expanded areas to make the surface materials.

Problems solved by the present invention:

In the former method, sections of the surface material consisting of the different material are heated and formed and then these surface materials are heated again with an exclusively made heater to bond the materials. Moreover, it is necessary to make the small element of the mold and the partition of the material containing mold contact each other precisely along the entire length. It is extremely difficult to arrange or maintain such a precise relationship between the mold and the material-containing mold so as to maintain the original shapes, because of thermal expansion of the mold in the heating process. When the joints of the surface materials change three-dimensionally, the materials may not be bonded properly at the tilted portions, where there is difference in height. Although these problems of maintaining the molds and the forming conditions may be partly solved by placing heat resistant cushions at places where the partition contacts the small element, the widened gap between joints of the surface materials makes the bonded section thicker and, in many cases, unbonded portions may result.

In the latter method, the molding process takes a large amount of time since it requires at least two molding processes to make one surface material. The yield rate is low because the materials of the surface materials mold attach to the opposite side of the surface material made previously.

In view of the above situation, the present invention is now to be described:

The heat-resistant mold having the inner surface corresponding to the product to be produced, and the second mold to contain materials, are put together to form the molding chamber inside; and the materials of powder, paste or liquid thermoplastic resin materials are then placed in the molding chamber. In heating the chamber to form the surface materials, a partition is formed to divide the overall mold into a plurality of molding chambers leaving a certain gap against the inner surface of the mold. A groove is provided on the upper end of the partition and a small projection corresponding to the groove is made on the inner surface of the upper mold wall. Different kinds of resin materials are placed in the plurality of chambers and a resin body is placed in the groove of said partition. The upper mold and the material-containing mold are put together with the projection inserted into the resin body to form the surface materials in the molding chambers simultaneously, and the surface materials in the adjacent chambers are bonded together by the melting resin in the groove.

EFFECT OF THE INVENTION

In this method, the surface materials made of or having different materials are formed and the joint is made at the same time in a single heating and molding process. The time required for molding is reduced, thereby improving productivity very significantly. Since each chamber contains only one kind of material, no attachment of the different materials on the opposite side of the surface materials will occur. This will greatly improve the yield rate for each thermoplastic resin material.

In this invention, a resin body is placed in the groove of the partition provided in the material containing mold; and the small projection formed inside the mold is inserted into resin body, thereby dividing the mold into a plurality of chambers. The slight difference of size of molds may be adjusted by the gap between the small projection and the inner wall of the groove which divides the mold into chambers, thereby maintaining sufficient thickness. This also applies to the thermal expansion. Therefore, this invention reduces the requirement of precision in making molds and controlling of forming conditions. The invention further facilitates firm bonding; that is, the bonding, sections are made into an effective three-dimensional shape, since surface materials in chambers are bonded by the resin body placed in the groove simultaneously with the forming of the surface materials.

BRIEF EXPLANATION OF DRAWING FIGURES

Figure 1:
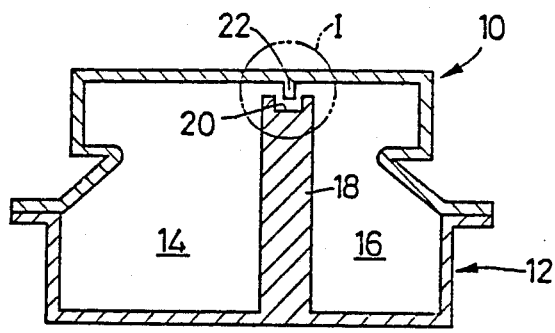
FIG. 1 shows the cross-sections of an example of suitable mold and material-containing mold used in this invention.
Figure 4:
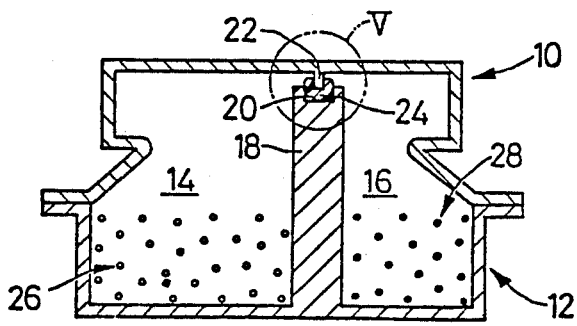
Figure 5:
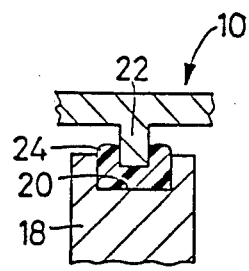
Figure 6:
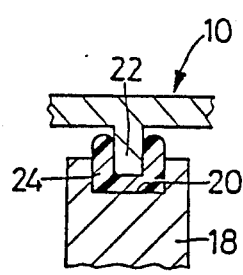
Figure 7:
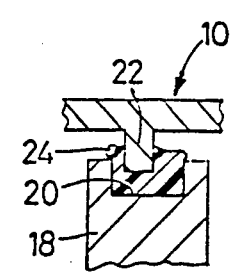
Figure 12:
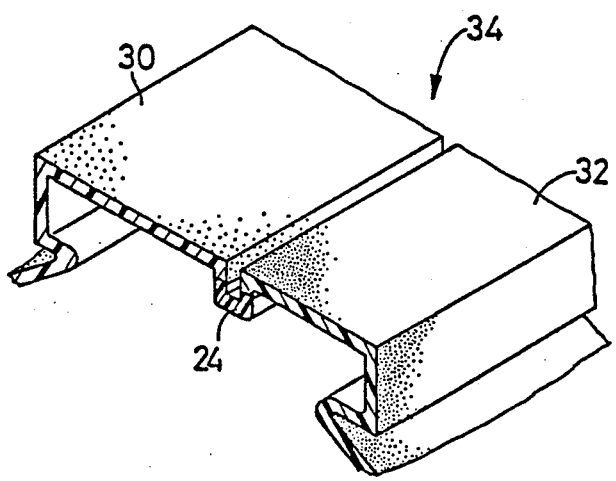

FIGS. 3, 4, 8, 9, 10, and 11 illustrate different processes of an example of the present invention using the mold and material containing mold shown in FIG. 1;

FIG. 5 is the enlargement of the section V of FIG. 4;

FIGS. 6 and 7 show the change of relative positions of the small projection and groove due to the difference in processing accuracy of the mold and material-containing mold respectively;

FIG. 12 is the diagonal view of the surface material made according to an example of the present invention using the mold and material containing mold shown in FIG. 1.

EXAMPLE

An example of the present invention is described in detail in order to clearly explain the invention with reference to the drawings. One example of a suitable mold and material containing mold are shown in drawing FIG. 1. The mold (10) has the inner surface corresponding to the product to be manufactured and is heated by a heating device (not shown) provided outside. The material-containing mold (12) contains thermoplastic material of powder or paste or liquid which is placed against the mold (10) to form the molding chamber.

Figure 2:
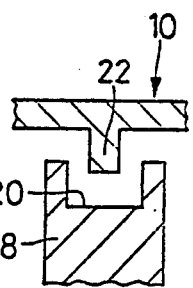
FIG. 2 is the partial enlargement of FIG. 1.

Inside the material-containing mold (12), a partition (18) is provided to divide the mold into the first molding chamber (14) and second molding chamber (16); and a groove (20) of a certain depth is made on the upper end of the partition. A small projection (22) is formed on the inner surface of the mold (10) against the groove (20). The mold (10) and material-containing mold (12) are put together and the upper end of the partition (18) stands against the mold (10) with a certain dimension of a gap in between as shown in detail in drawing FIG. 2, and, the small projection (22) is provided which will be inserted into the groove (20) of the partition (18) against the inner surface of the groove (20) with a certain gap in between. The mold (10) and material-containing mold (12) are made to maintain a gap of approximately several millimeters between the upper end of the partition (18) and the mold (10), and a gap of approximately the same size between the small projection (22) and the inner surface of the groove (20). The partition (18) may be made separately, and is not necessarily made in one unit with the material-containing mold (12).

Figure 3:
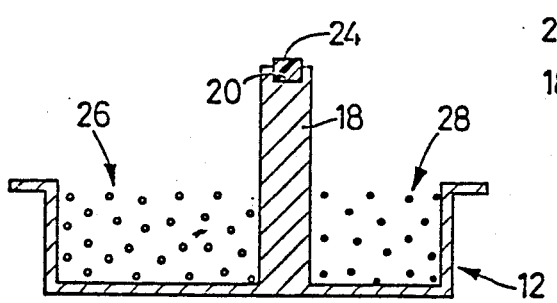

In order to form the surface material having partially different materials using the mold (10) and material-containing mold (12), a generally belt shaped heat plastic resin body (24) is formed in the groove (20) of the partition (18) as shown in drawing FIG. 3, and thermoplastic resin materials of different kinds (26, 28) are placed in the gap against the first molding chamber (14) and the second molding chamber (16) of the material containing mold (12). In place of the belt shaped resin body (24), suitable bodies made of urethane or polyethylene may also be used.

With respect to the resin materials (26) and (28), vinyl chloride resin is most often used, although numerous other resins can alternatively be used in a satisfactory manner.

The material-containing mold (12) containing these resin materials is heated and placed against the mold (10) as illustrated in drawing FIG. 4. At this time, the resin body (24) placed in the groove (20) is melted by the heat produced by the small projection (22), allowing the entry of the projection into the resin body.

If there are some variations in the small projection (22) and partition (18) in the processing accuracy, the gap between the small projection (22) and the inner wall of the groove (20) is made narrower as shown in drawing FIGS. 6 or 7, but the first molding chamber (14) and the second chamber (16) may be easily separated if the groove (20) and small projection (22) are designed to take into account possible differences in size. The dimensions of the groove (20) and small projection (22) and resin body (24) may alternatively be designed as shown in drawing FIGS. 5 to 7, to provide a certain gap between the resin body (24) and the upper end of the mold (10) when both molds are put together.

Figure 8:
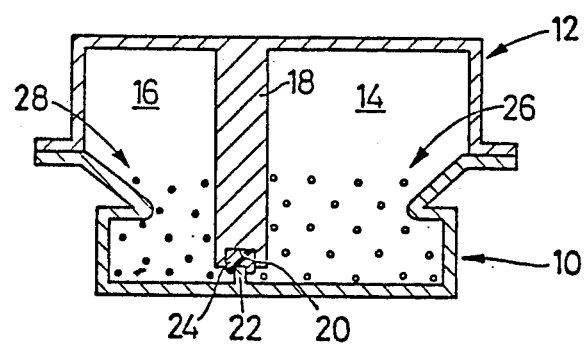
Figure 9:
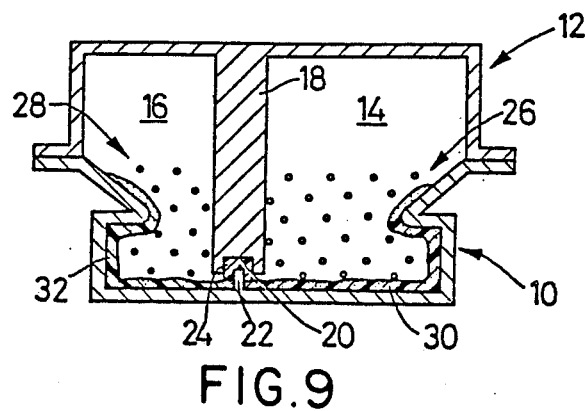

After matching the molds, the positions of the mold (10) and material containing molds (12) are reversed or turned upside down as shown in drawing FIG. 8 to move resin material (26) and (28) in the first chamber (14) and second chamber (16) into the gap of the molds (10). The molds are then heated in the forming process.

In this way, the surface materials (30) and (32) are made of different resin materials (26) and (28) inside the molds of the molding chambers (14) and (16), with thickness and shape according to the molds (10), and at the same time the joint between the surface (30) and (32) is bonded through the resin body (24).

Although the gaps between the partition (18), the resin body (24) and the inner walls of the molds, and the gap between the small projection (22) and inside wall of the groove (20) are reduced due to thermal expansion, the change will be compensated for, since the groove (20) and small projection (22) are so designed to adjust the change as in the case of difference in size.

Figure 10:
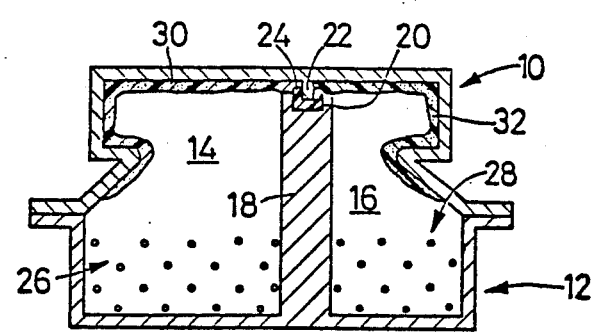
Figure 11:
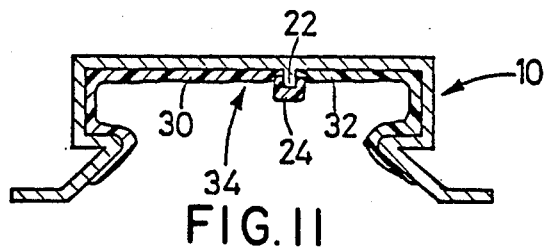

After heating and forming, the mold (10) and material containing mold (12) are again reversed or turned upside down, to move unmelted resin materials (26) and (28) into the space of the material containing mold as illustrated in the drawing FIG. 10. Then the molds are opened and separated as shown in drawing FIG. 11 and the hardened surface materials (30) and (32) are removed from the mold (10) as a composite surface material (34). The completed surface material is shown in drawing FIG. 12.

As clearly shown in drawing FIG. 12, the surface material (34) manufactured according to the present invention has the surface (30) and (32) made of materials (26) and (28) and the product is attractively and clearly divided by the resin body (24). The joint of each surface (30 and 32) is very firm since it is bonded through the resin body (24).

The surface material (34) is made in one process of heating and molding which significantly reduces the time required for molding, and productivity is greatly improved. Resin materials (26) and (28) are used only for materials of the surface (30) and (32), and remaining resin materials (26) and (28) are used for new forming cycles, which greatly improves yield.

Moreover, control of the molding conditions and operation is relatively easy since the slight variation of processing accuracy of the mold (10), and the material-containing mold (12), and the effect of thermal expansion on the molds is allowed to some extent, and the forming chambers (14) and (16) come off easily. Moreover, there will be no danger of forming unbonded portions of the joint of the surface (30) and (32), even if it has a three dimensional shape.

In the above example, the molding chamber is divided into the first chamber (14) and the second chamber (16) between the mold (10) and material containing mold (12). The number of chambers may suitably be increased or decreased according to the number of different materials desired. The cross-sectional shapes of the small projection (22), groove (20) or resin body (24) may also be suitably altered as necessary. The shape of inner surface of the mold (10) divided by the partition (18) may be changed according to the design of the surface materials and the like.

Other changes and alterations may be made to the method apparatus, and products of the present invention without making deviations from the basic concepts of the invention.

This invention is particularly useful in the manufacture of automotive vehicle parts, such as seats, head rests, instrument panels, door panels, center consoles, glove compartments, door linings and the like.

While it will be apparent that the preferred embodiments of the invention disclosed are well calculated to fulfill the objects, benefits and advantages of the invention, it will be appreciated that the invention is susceptible to modification, variation and change without departing from the proper scope or fair meaning of the subjoined claims.

What is claimed is:

1. A method of making a molded product in a mold which is separable and includes a material containing mold part, a forming mold part, a partition means for dividing said material containing mold part into at least two different molding volumes, a groove means extending generally across at least one end of said partition means operative to accommodate a resin body, and a projection means on the inside of said forming mold part and cooperating with said groove means and said resin body to assist in providing said different molding volumes, comprising the steps of:

placing said resin body in said groove means;

placing moldable resin materials of different kinds into said molding volumes;

heating said mold;

placing said material containing mold part against said forming mold part to close said mold and to melt said resin body into said groove means by heat produced by said projection means to allow the entry of said projection means into said resin body;

at least partially rotating said mold such that said different kinds of resin materials are placed against said forming mold part and whereby said different kinds of resin materials are bonded through said melted resin body; and separating said mold parts and removing said molded product.

* * * * *